United States Patent
Van Asten et al.

(10) Patent No.: US 6,879,770 B1
(45) Date of Patent: Apr. 12, 2005

(54) METHOD OF REVERSE PLAYBACK OF A MPEG VIDEO STREAM

(75) Inventors: Petrus Jacobus Hubertus Johannes Van Asten, Eindhoven (NL); Rodolfus Johannes Maria Van Der Meer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 898 days.

(21) Appl. No.: 09/712,683

(22) Filed: Nov. 14, 2000

(30) Foreign Application Priority Data

Nov. 17, 1999 (EP) .......................................... 99203823

(51) Int. Cl.[7] .............................. H04N 5/91; H04N 5/85
(52) U.S. Cl. .......................... 386/68; 386/69; 386/125
(58) Field of Search .............................. 386/68, 67, 69, 386/70, 77, 82, 609, 111, 112, 125, 124, 40, 45, 6, 7, 27, 33

(56) References Cited

U.S. PATENT DOCUMENTS 5,959,690 A * 9/1999 Toebes et al. .............. 348/578
6,078,722 A * 6/2000 Kawamura et al. .......... 386/68

FOREIGN PATENT DOCUMENTS

| EP | 0735780 A2 | 10/1996 |
| EP | 0737011 A2 | 10/1996 |
| EP | 1005226 A2 | 5/2000 |

* cited by examiner

*Primary Examiner*—Robert Chevalier

(57) ABSTRACT

A method of decoding MPEG coded digital data, received in a forward reproduction order in least one Group Of Pictures (GOP) according to the MPEG standard, for producing decoded pictures for display in reverse playback order. Tho this purpose a limited number of decoded frames is temporarily stored while repeatedly same coded picture data is retrieved in a forward reproduction order to produce decoded picture data, employing the decoded temporarily stored picture data. This has as an advantage that the amount of temporarily storage capacity required, approximately equals the amount required for forward playback. In a specific embodiment, wherein the MPEG data cotains either NTSC GOPs or PAL GOPs, only temporarily storage capacity of four picture frames is required in case of reverse playback, compared with three in case of forward playback.

7 Claims, 8 Drawing Sheets

GOP - description (display - order):

B I1 B P2 B P3 B P4 B P5 B P6 B P7 B P8 B P9

GOP - description (display - order):

B I1 B P2 B P3 B P4 B P5 B P6 B P7

GOP - description (display - order):

I1 B P2 B P3 B P4 B P5 B P6 B P7 B P8

US 6,879,770 B1

METHOD OF REVERSE PLAYBACK OF A MPEG VIDEO STREAM

FIELD OF THE INVENTION

The invention relates to a method according to the preamble of claim 1.

The invention also relates to a decoding arrangement according to the preamble of claim 4. The invention further relates to a reproducing apparatus according to the preamble of claim 7.

BACKGROUND OF THE INVENTION

A MPEG video stream according to the MPEG2 video standard (ISO/IEC 13818-2) comprises intra frame coded pictures (I-pictures) and predictive coded pictures (B- and P-pictures). An I-picture comprises all the information required to produce the corresponding decoded picture. However, for decoding a P-picture, a preceding decoded P-picture or I-picture is required, while for decoding a B-picture a preceding decoded I-picture or P-picture and a decoded succeeding I-picture or P-picture are required. A MPEG stream is further composed of Groups of Pictures (GOP). Each GOP starts with an I-picture, followed by several B-pictures and P-pictures. During playback, pictures of a GOP are decoded starting from decoding the I-picture followed by decoding the successive B-pictures and P-pictures. In practice, in case of forward playback, at most two picture buffers are required to store temporarily two decoded pictures in order to decode a picture. However, reverse playback requires, in a simple straightforward embodiment, picture buffers for all pictures of a GOP, as for decoding the last picture in a sequence of pictures in a GOP, all preceding pictures should be available in decoded form. This has the disadvantage of requiring a large amount of memory, resulting in high costs.

A method of reverse playback of MPEG coded pictures, as well as an apparatus for performing the method is known from U.S. Pat. No. 5,892,882. When reverse playback is instructed, an MPEG decoder repeatedly, whenever it is required, produces coded pictures from the beginning of the GOP. Thus no decoded pictures need to be stored in picture buffers. Needless to say, this leads to either a reverse playback at a low speed or to reverse playback at normal speed, but with a high speed decoder.

OBJECT AND SUMMARY OF THE INVENTION

In consequence, amongst other things, it is an object of the invention to obviate the above-mentioned disadvantages. According to one of its aspects a method according to the invention is characterized by the characterising part of claim 1. A decoding arrangement according to the invention is characterized by the characterizing part of claim 4.

By temporarily storing decoded picture data, the number of times that the same compressed data is retrieved and decoded is reduced. However, by still allowing a smaller amount of repeatedly retrieving and decoding of the same coded picture data, use can be made of already available temporarily storage capacity for forward playback and a relatively large increase of storage capacity can be avoided.

BRIEF DESCRIPTION OF THE DRAWINGS

These and further aspects and advantages of the invention will be discussed in more detail hereinafter with reference to the disclosure of preferred embodiments, and in particular with reference to the appended Figures that show.

DESCRIPTION OF THE EMBODIMENTS

Figures 1, 2, 4, 6:
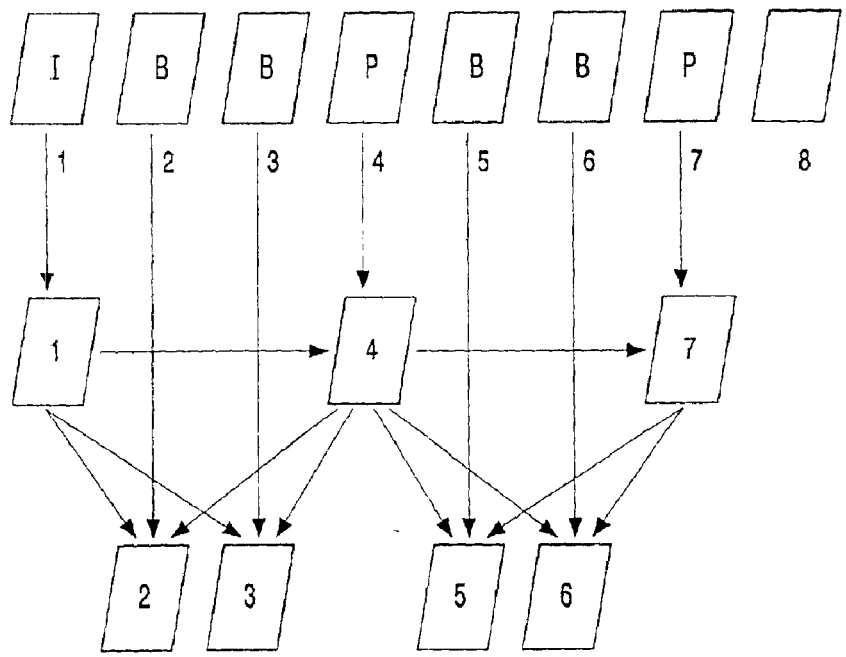
FIG. 1 schematically the decoding of a first part of a Group Of Pictures (GOP)
FIG. 2 a GOP of 18 frames according to the NTSC standard.
FIG. 4 a GOP of 14 frames according to the PAL standard.
FIG. 6 a GOP of 15 frames according to the Pal standard.

FIG. 1 shows schematically a first part of a Group Of Pictures in display order. The first rows depicts a sequence of intra coded pictures (I-picture) and predictive coded pictures (B-pictures and P-pictures). The second and third rows depict the corresponding decoded pictures. The pictures are numbered according to display order. The arrows indicate which picture, either coded or decoded, is required to obtain the decoded picture the arrow(s) are point(ing) to. For instance, the picture numbered 1 is obtained by decoding the I-picture 1. The picture numbered 2 is obtained by decoding the coded B-picture 2 and combining with the decoded I-picture 1 and decoded B-picture 4. Picture 4 is obtained by decoding coded P-picture 4 and the combination with the decoded picture 1. It is noted that for decoding the higher numbered pictures, the immediately proceeding lower numbered pictures need to be available in decoded form. This also accounts for the two immediately following higher numbered pictures.

For forward playback, this may be solved by at maximum three picture buffers for storing the decoded pictures.

However, for reverse playback, in case a Group Of Pictures (GOP) is received, this is not sufficient. Ideally, the number of picture buffers should then be equal to at least the number of pictures in a GOP. In case of MPEG-2 video for NTSC, such as stored for example on DVD-discs, the corresponding GOP has 18 pictures or frames. Note that according to NTSC video, a frame consists of two picture fields. FIG. 2 shows, in display order, a GOP according to NTSC video with 18 frames. Denoted is a worst case GOP for NTSC with at least 1 B-frame between reference frames P and I and only one I-frame (GOPs with multiple I-frames can be broken into two sequences with each one I-frame). FIG. 4 illustrates a worst case GOP for PAL video with 14 frames and FIG. 6 illustrates another worst case GOP for PAL video with 15 frames.

The size of a PAL frame buffer is 720*576*12 bit=4,976,640 bit=622,080 byte. The size of a NTSC frame buffer is 720*480*12 bit=4,147,200 bit=518,4300 byte. With normal forward play a buffer memory of at maximum 3 PAL frame buffers is required: 1,866,240 Byte. It shall be shown hereinafter, that for reverse playback according to the method of the invention, only four PAL frame buffers or four NTSC frame buffers suffice.

Thus leading for PAL to a required buffer memory of 2,488,320 Byte and for NTSC to a required buffer memory of 2,073,600 Byte. Needed is thus 2,488,320 byte=2,37 Mbyte=18,98 Mbit of buffer memory. Compared with normal playback, which needs 1,866,240 byte=14,24 Mbit, only 34% more memory is needed for reverse playback. In a practical decoder system with 64 Mbit of memory, only 19 Mbit has to be reserved for frame store.

In the disclosed methods and apparatus for performing the methods according to the invention, it will be assumed that a decoder for decoding MPEG-2 video pictures, will have the following characteristics:

1. The decoder is adapted to decode a frame in one field period. This is called a double speed decoder.
2. The GOP should contain at least one B frame between the reference I and P frames (otherwise the compression is not efficient)
3. The decoder must be able to decode from an arbitrary place in a memory wherein the MPEG-2 encoded pictures of a GOP are being temporarily stored. For instance, in a player memory after being read from a DVD disc and consequently demodulated.
4. A kind of Start Code Detector is needed to find the place where all frames from a Video Object Unit (VOBU) are in memory.
5. It must be possible to program a display unit separately from the decoder.

The method and apparatus according to the invention will be illustrated with reference to the three worst case GOPs as illustrated respectively in FIGS. 2, 4 and 6.

Figure 3:
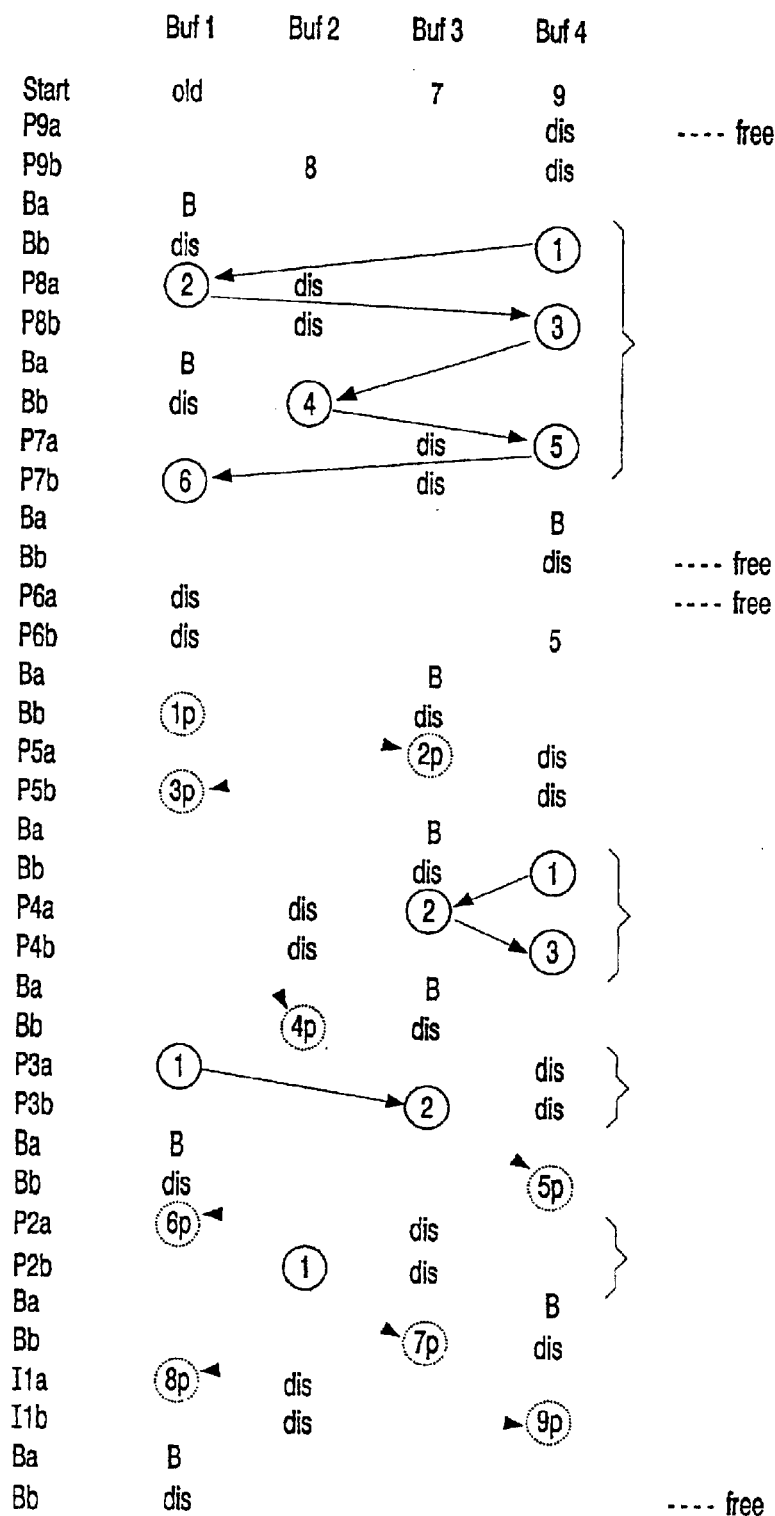
FIG. 3 successively the decoding steps of the GOP of FIG. 2 employing 4 frame buffers according to a first method of the invention.

FIG. 3 illustrates the steps to be taken when to decode the NTSC GOP as shown in FIG. 2. The first line denotes an arbitrary start sitution which will have to be reached after all steps for decoding a GOP have been completed, but then for a next GOP. The first column denotes the picture field, either the first (a) or the second (b) of a picture to be displayed (dis), with the first picture to be displayed numbered P9 and the last one numbered I1. The successive steps are denoted with the referenced frame field in the first column. This in accordance with a reverse playback of the GOP as shown in FIG. 2.

The start situation ('start') assumes the picture 'old' in buffer 1 to be currently displayed. The buffer 3 and 4 contain the decoded frames P7 and P9. In the following P9a is the first field of displaying frame P9 and P9b is the second field of displaying P9 and so on.

A step P9a, field P9a is displayed. In the same line is indicated that the decoder is 'free' during this step.

At step P9b, field P9b of frame P9 is displayed. Simultaneously, frame P8 is decoded and stored in buffer 2. (A decoder decodes a frame within a field period)

In the next step Ba, the first field Ba of the next frame B is decoded, using the decoded frames of P8 and P9, stored respectively in buffer 2 and buffer 4. During decoding the first field Ba is displayed. (A picture may be displayed seperately from the decoder)

In the next step Bb, the second field Bb is displayed while the decoder is decoding frame I1. The decoded frame I1 is stored in buffer 4. (No other decoded frames are required to decode frame I1)

In step P8a, the field P8a of frame P8, which is stored in buffer 2, is displayed. Meanwhile, frame P2 is decoded, employing the decoded frame I1, wich is stored in buffer 4. (It is noted that it is assumed that the decoder may address and read the coded frames directly from a memory where they have been stored). The previous content of buffer 1 is overwritten.

In step P8b, the field P8b of frame P5, which is stored in buffer 2, is displayed. Meanwhile, frame P3 is decoded, employing decoded frame P2, which is stored in buffer 1.

In step Ba, the next frame B is decoded, employing the decoded frames P8 and P7, which are stored respectively in buffer 2 and buffer 3. Simultaneously, field Ba therefrom is displayed.

In step Bb, the field Bb of the this frame B is displayed, while frame P4 is decoded, employing frame P3, which is stored in buffer 4. Note that the content of buffer 2 is overwritten.

In step P7a, the field P7a of frame P7, which is stored in buffer 3, is displayed. Meanwhile, frame P5 is decoded, employing the decoded frame P4, which is stored in buffer 2.

In step P7b, the field P7b of frame P7, which is stored in buffer 3, is displayed. Meanwhile frame P6 is decoded, employing decoded frame P5, which is stored in buffer 4.

In step Ba, the field Ba of the next frame B, is decoded, employing the decoded frame P6, which is stored in buffer 1, and frame P7, which is stored in buffer 3. The field Ba is displayed simultaneously. It is noted, that in order to decode this frame B, previous frames P1, P2, P3,P4, P5 and P6 have been decoded in previous steps.

In step Bb, field Bb of this frame B is displayed. The decoder is 'free' during this step.

In step P6a, field P6a of frame P6, which is stored in buffer 1, is displayed.

In step P6b, field P6b of frame P6, which is stored in buffer 1, is displayed. Meanwhile, frame P5 is decoded and stored in buffer 4, employing frame P4, which is stored in buffer 2.

In step Ba, field Ba of the next frame N, is decoded, employing the decoded frames P5 and P6, stored respectively in buffer 1 and buffer 3. The field Ba is displayed simultaneously.

In step Bb, the field Bb of this frame is decoded and displayed, employing the frames P5 and P6. Also frame I1p of the previous GOP is decoded and stored in buffer 1. This, as will appear from the next steps, in order to be able to decode the frame B, preceding the frame I1 in the current GOP.

In step P5a the field P5a of frame P5, which is stored in buffer 4, is displayed. Meanwhile the frame P2p of the previous GOP is decoded and stored in buffer 3, employing the decoded frame I1p of the previous GOP, which is stored in buffer 1.

In step P5b, the frame P3p of frame P3 of the previous GOP is decoded and stored in buffer 1, employing the decoded frame P2p, which is stored in buffer 3. Meanwhile, field P5b of frame 5, which is stored in buffer 4, is displayed.

In step Ba, field Ba of the next frame B is decoded and displayed, employing decoded frames P4 and P5, stored respectively in buffer 2 and buffer 4.

In step Bb, field Bb of this frame is displayed. Meanwhile, for the second time, frame I1 of the current GOP is decoded and stored in buffer 4. As will be clear from the next steps, the frame I1 is required to come to decode frame P3, which has been overwritten in step P7a. The frame P3 is required to decode neighbouring B frame.

In step P4a, field P4a of frame P4, which is stored in buffer 2, is displayed. Meanwhile frame P2 is decoded employing decoded frame I1, which is stored in buffer 4.

In step P4b, field P4b of frame P4 is displayed. Meanhile frame P3 is decoded, employing frame P2, which is stored in buffer 3. Note that decoded frame I1 is overwritten.

In step Ba, field Ba of the next frame B is decoded, employing the decoded frames P2 and P3, which are stored in respectively buffer 3 and buffer 4. It is noted this is the reason of decoding the frames I1, P2 and P3 a second time.

In step Bb, the field Bb of this frame is displayed, emptying the previously mentioned frames P2 and P3. Meanwhile, frame P4p of the previous GOP is decoded, employing frame P3p, which is stored in buffer 1.

In step P3a, field P3a of frame P3 is displayed, which is stored in buffer 4. Meanwhile, frame I1 of the current GOP is decoded again, for a third time.

In step P3b, field P3b of frame P3 is displayed. Meanhwile, frame P2 of the current GOP is decoded for a third time, employing frame P1, which is stored in buffer 1.

The following steps can be uambiguously derived from FIG. 3. Herewith it is noted that in step P2b, the frame I1 if decoded for a fourth time, while the previous decoded one has been overwritten in step Ba, following step P3b. Further it is noted that in step I1b, frame P9p of the previous GOP is decoded, just in time when the last frame B of the current GOP has to be decoded. Step Bb shows the same situation as as is shown with the first step 'Start'.

Note that during decoding of a B-frame, the B-frame is also displayed, just as described in the SystemTargetDecoder of the referred MPEG standard.

Figure 5:
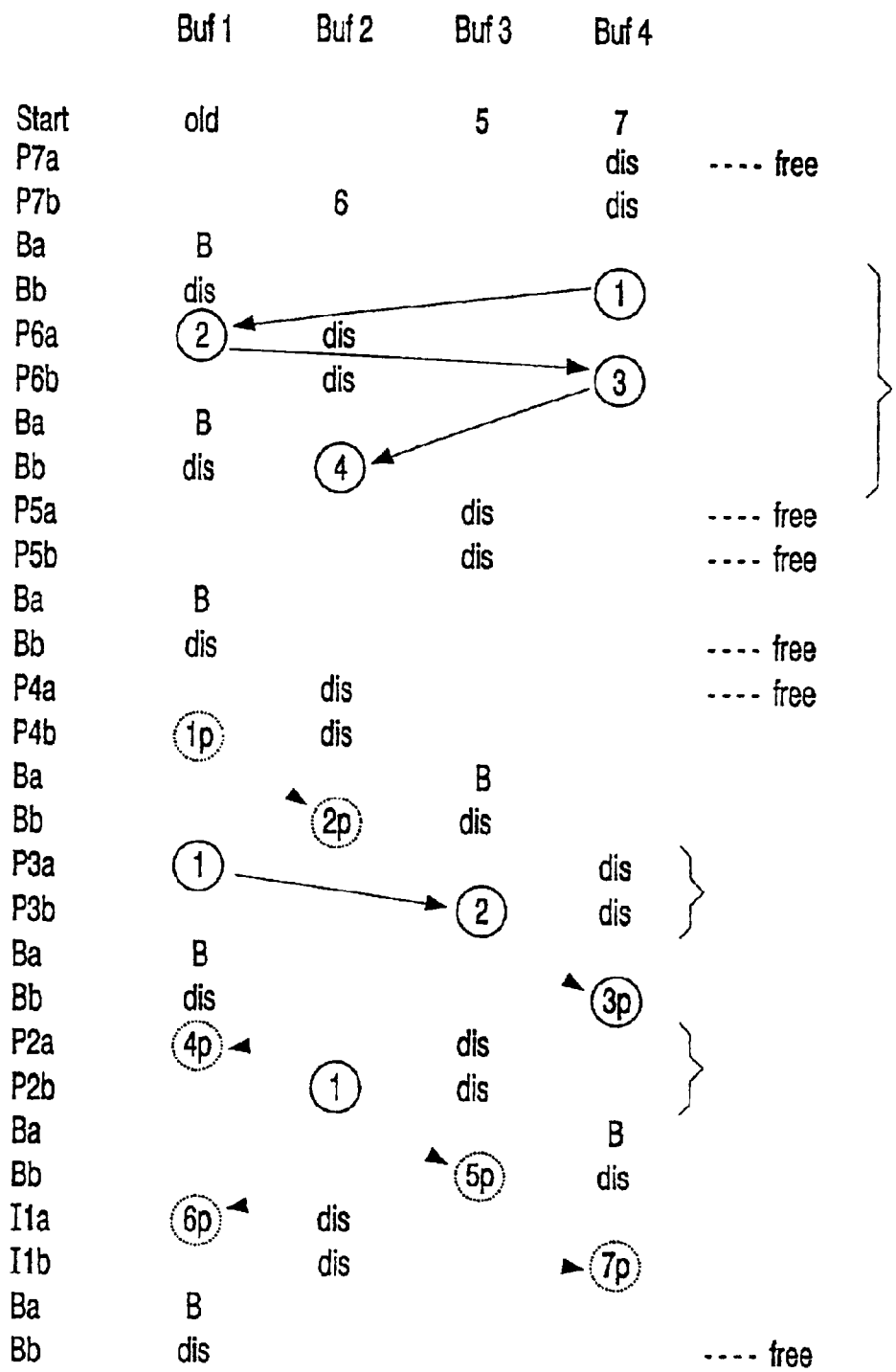
FIG. 5 successively the decoding steps of the GOP of FIG. 4 employing 4 frame buffers according to a second method of the invention.
Figure 7:
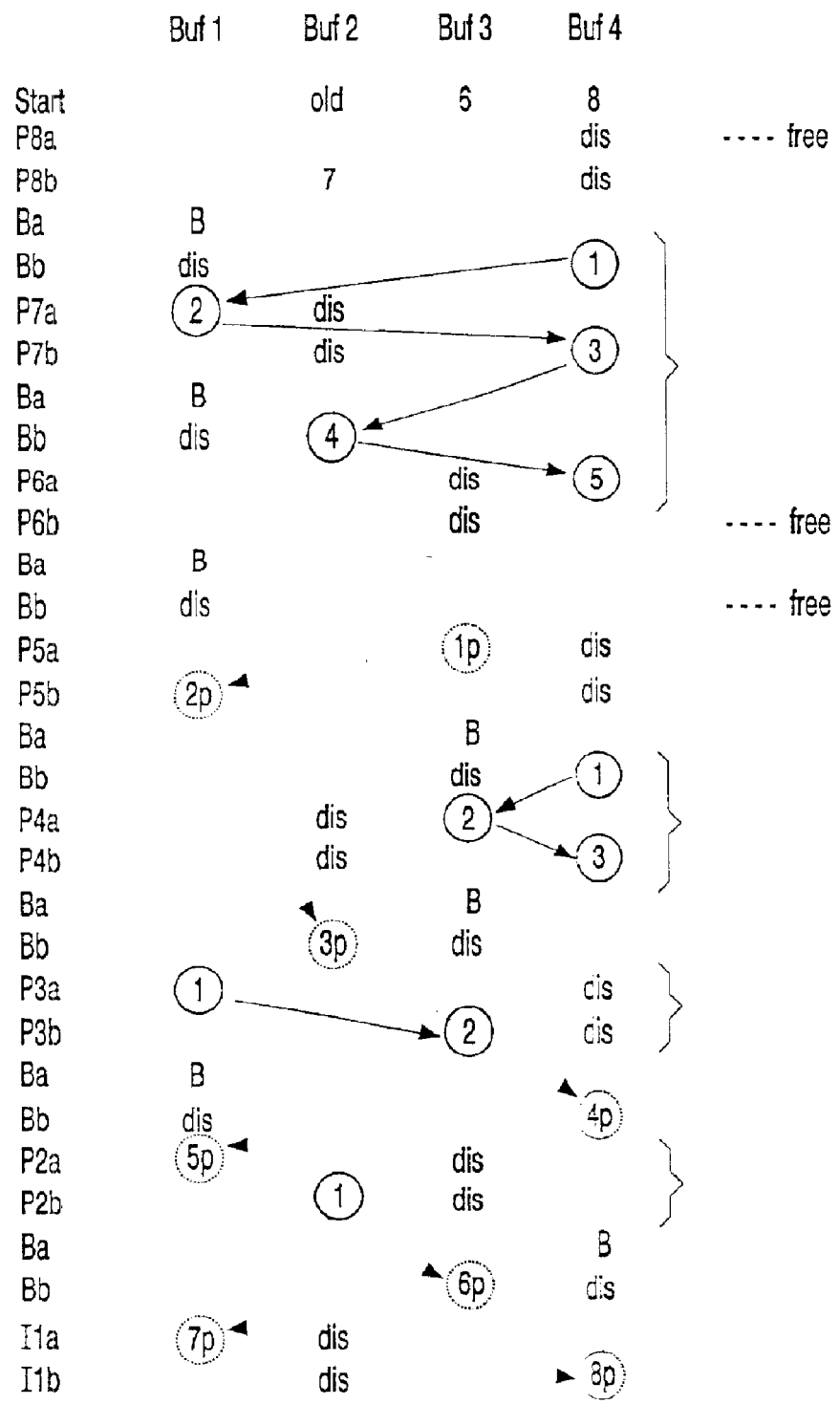
FIG. 7 successively the decoding steps of the GOP of FIG. 6 employing 4 frame buffers according to a third method of the invention.

FIG. 5 shows the successive steps required to decode the 14-frames PAL GOP shown in FIG. 4. The successive steps will not be discussed in particular, as they may easily be derived from the figure, similar as shown with FIG. 3. It is noted that frame I1 is decoded three times, starting respectively at step Bb following step P7b, step P4b and step P2b. Further it is noted that at step P4b the frame I1p of the previous GOP is decoded, leading finally to decoding of frame P7p of the previous GOP at step I1b.

FIG. 6 shows the successive steps required to decode the 15 frames PAL GOP shown in FIG. 6. It is noted that frame I1 is decoded four times: at step Bb following step P8b, at step Bb following step P5b, at step P3a and at step P2b. Further, frame I1p of the previous GOP is decoded at step P5a, leading finally to decoding of frame P8b at step 1b.

Although the above algorithms are based on a SystemTargetDecoder it will also works on the commercial available decoders who will have a 1-field latency between decoding and displaying. In that case all displaying is delayed for 1 field.

This will sometimes results in a situation where there is being decoded in the same buffer as the buffer from which is being displayed. But this should not be a problem because this also happens during normal play having a stream without B-frames or when having a stream with 2 (or more) B-frames between the reference frames.

Decoders are programmed then so that the decoder may not "overtake" the display-unit; this guarantees that the decoder is not corrupting the display-units data. Thus it is shown that it is possible to do reverse-play of NTSC streams with use of 4 NTSC-size framestores. For PAL 4 PAL-size framestores are needed. Note that for normal play forward 3 framestores are needed.

Although the invention has been discribed with reference to a preferred embodiment comprising 4 frame buffers, it is to be understood that this is not a limitative example. Thus, various modifications thereof may become apparent to those skilled in the art, without departing from the scope of the invention, as defined by the claims.

Figure 8:
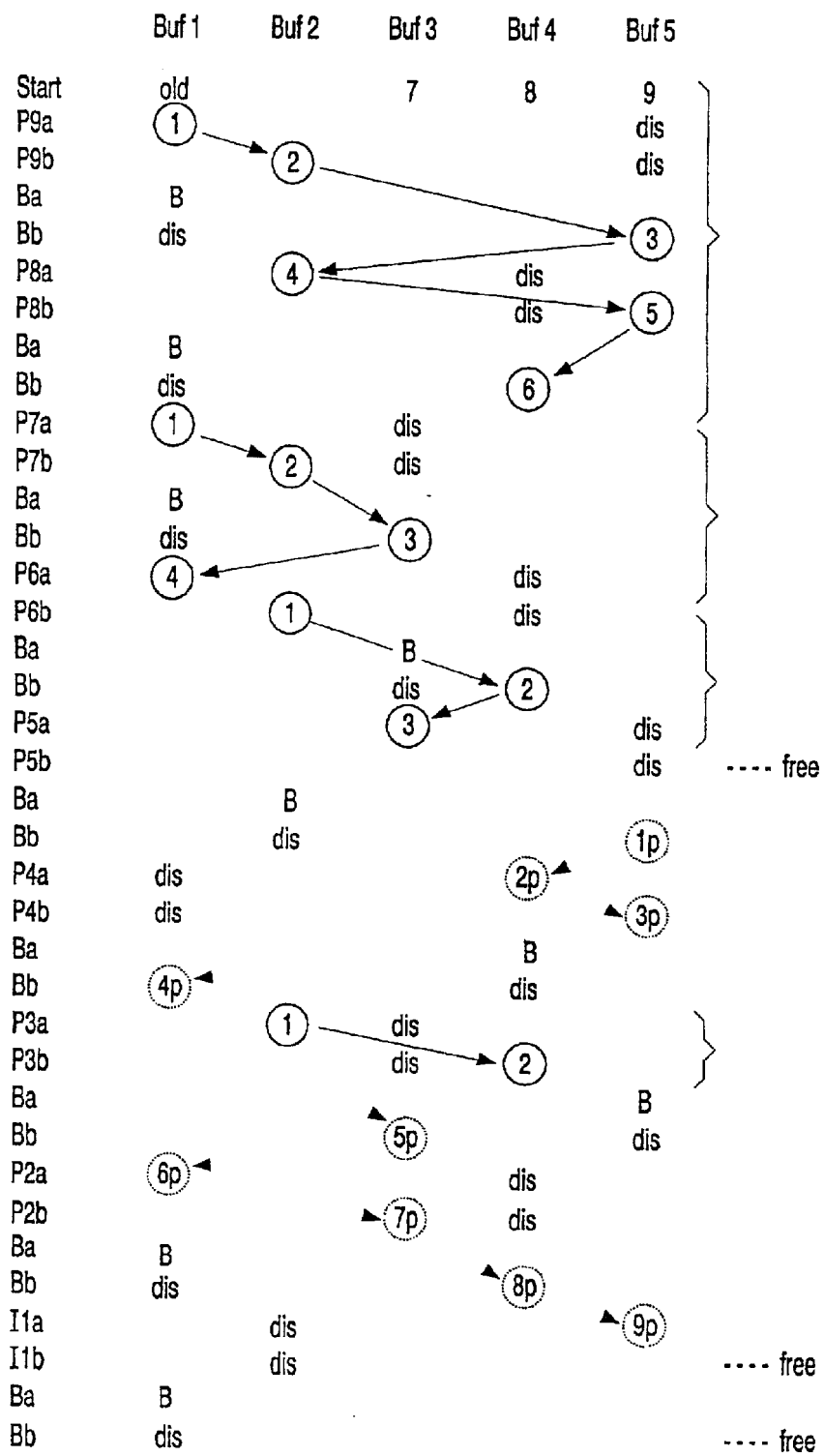
FIG. 8 successively the decoding steps of the GOP of FIG. 2 employing 5 frame buffers according to a fourth method of the invention.

For instance, FIG. 8 illustrates an alternative embodiment of the method according the invention of decoding the NTSC GOP of 18 frames as shown in FIG. 2 employing 5 frame buffers in stead of 4 frame buffers.

Figure 9:
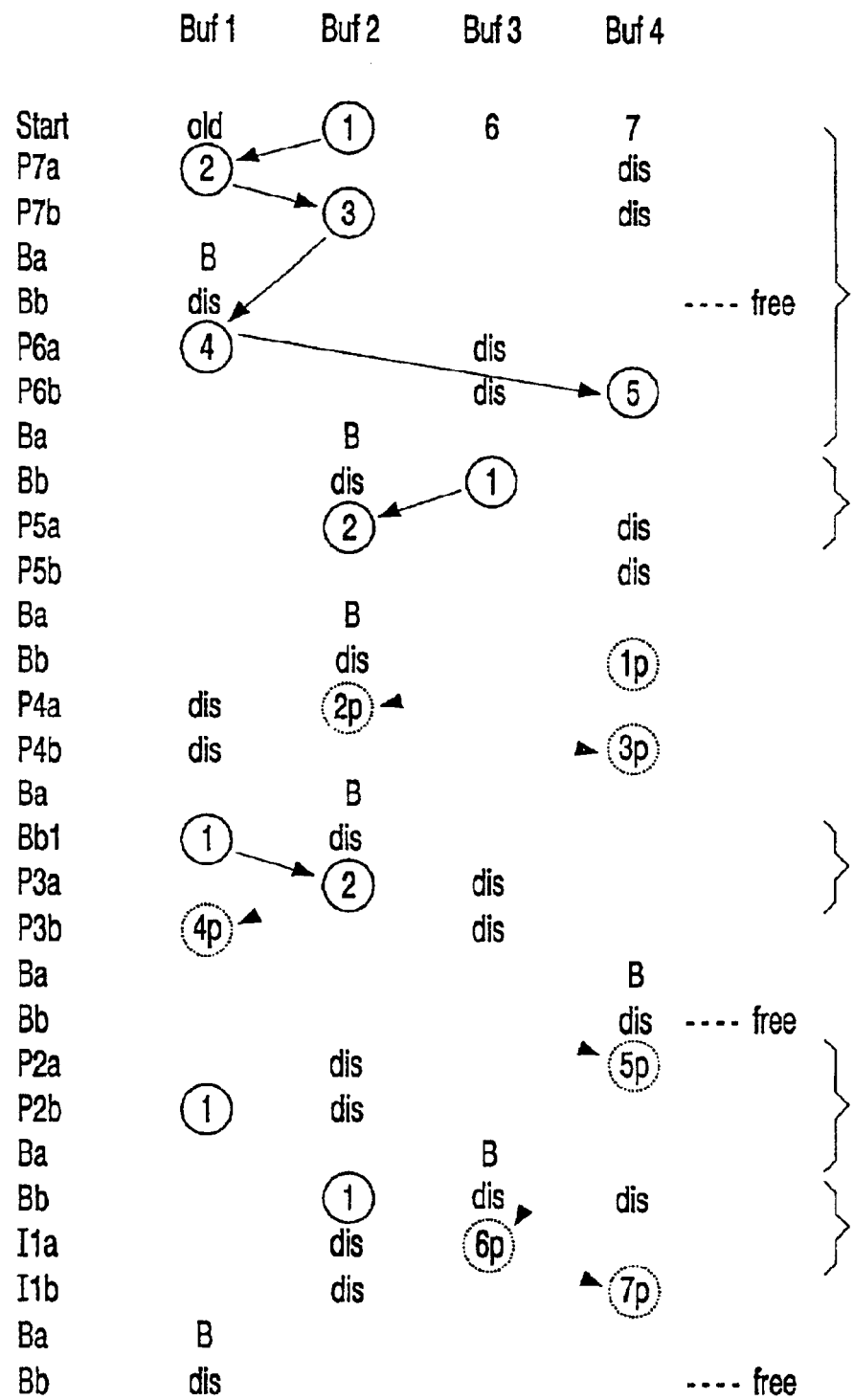
FIG. 9 successively the decoding steps of the GOP of FIG. 4 employing 4 frame buffers according to a fifth method of the invention.

FIG. 9 illustrates a further alternative embodiment of decoding the PAL GOP of 14 frames as shown in FIG. 4 employing 4 frame buffers.

Figure 10:
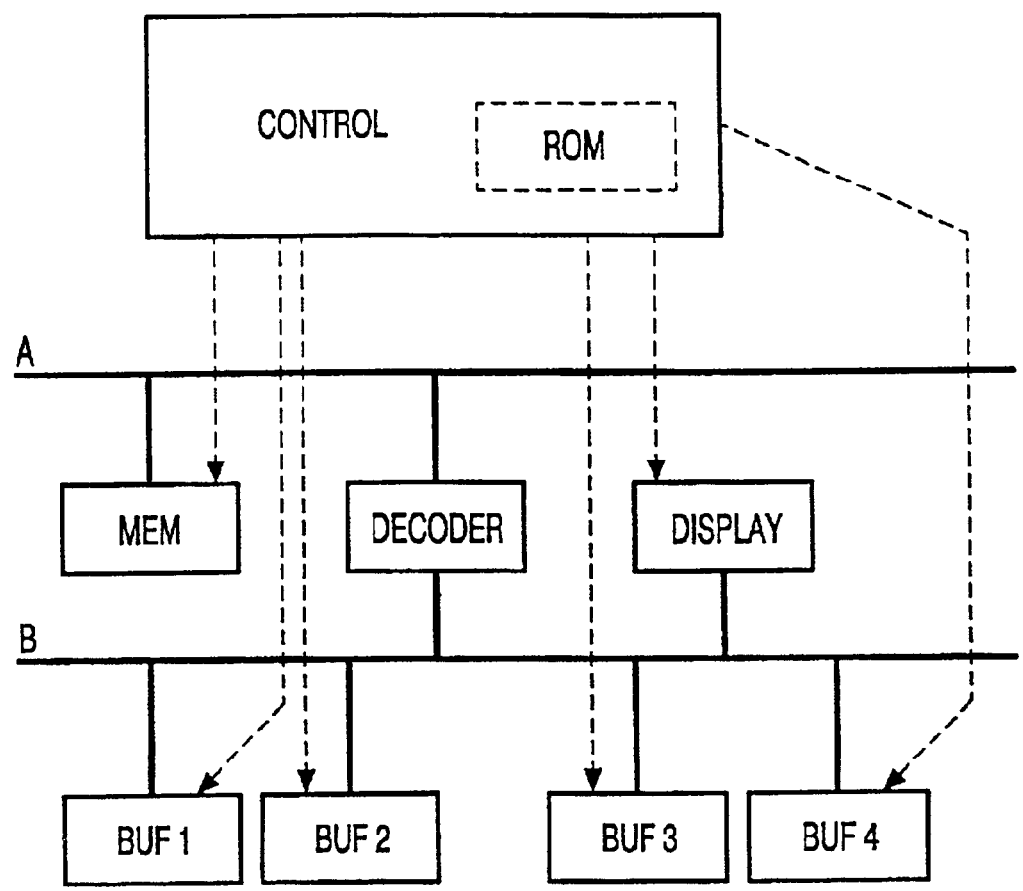
FIG. 10 schematically a decoding arrangement according to a first embodiment of the invention and FIG. 11 schematically a reproducing apparatus for reproducing signals stored on a recording medium of the optically type.

FIG. 10 shows schematically an arrangement in accordance with the invention for decoding an MPEG-2 video comprising 4 frame buffers (BUF1, BUF2, BUF3, BUF4). Incoming MPEG-2 coded frames are being transferred over data bus A to memory means (MEM). A controller (CONTROL) provided with program memory means (ROM), which is loaded with a program for performing one of the previously disclosed methods, enables retrieval of coded frames from this memory (MEM) and submittal to a MPEG decoder (DECODER) for decoding. The decoded frames are transferrred via data bus B to either display means (DISPLAY) and/or to buffer means (BUF1, BUF2, BUF3, BUF4) for temporarily storage.

Figure 11:
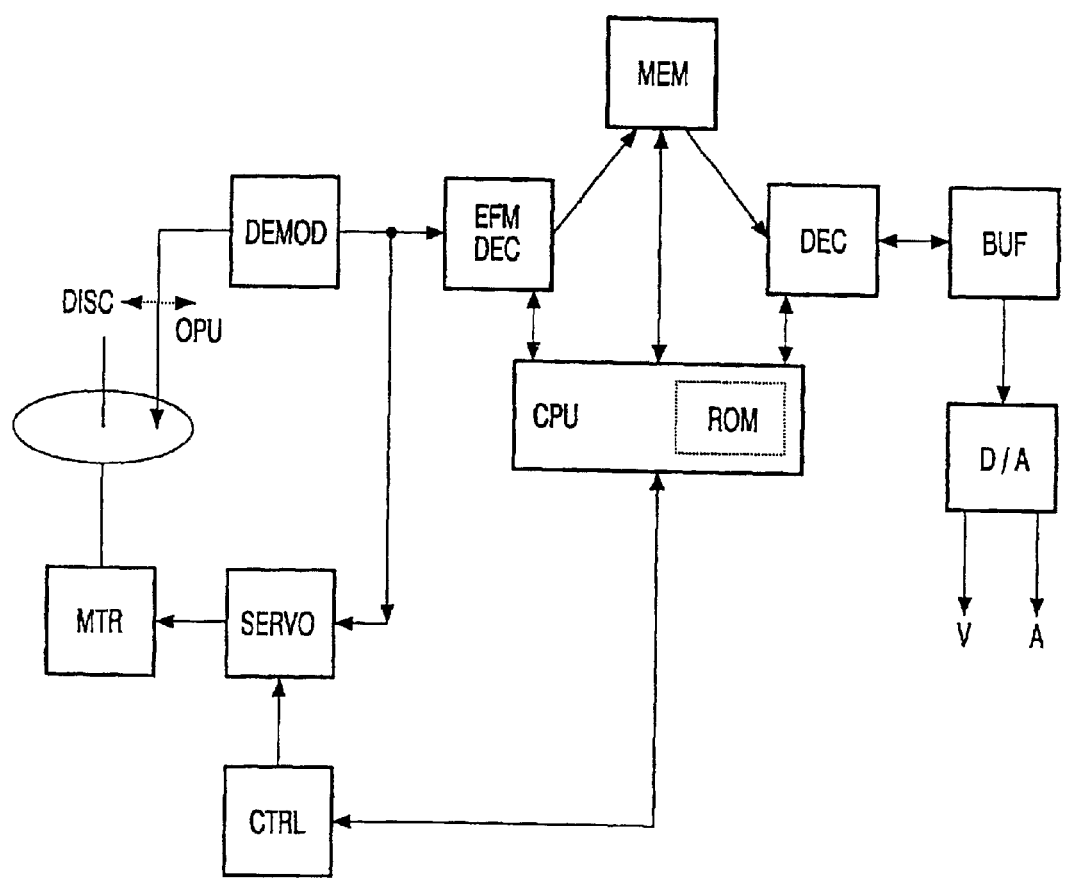

FIG. 11 shows schematically a reproducing apparatus for reproducing video stored on a disc of the optically type (DISC), such as for example a DVD-disc. A detection signal representing the information stored on this disc (DISC) is being generated by an optical pick up unit (OPU), scanning the tracks of the disc (DISC) and submitted to demodulator means (DEMOD) for obtaining a channel bit stream. The output of the demodulator (DEMOD) is submitted to servo means (SERVO) that controls a unit (MTR) for rotationally driving the disc (DISC). The channel bit stream is decoded by a channel decoder (EFM DEC) wherafter the resulting coded MPEG coded frames are stored in memory means (MEM). Central control means (CTRL) are provided to control this servo means (SERVO). The decoding of the stored MPEG code frames in memory (MEM) is controlled by decoding control means (CPU). The decoding control means (CPU) comprises to this purpose a program memory (ROM) that contains a control program for decoding the coded frames in accordance with one of the previously disclosed methods. The decoding control means (CPU) enable retrieval of coded frames from the memory means (MEM) and submittal to an MPEG-2 decoder (DEC). Frame buffer means (BUF), comprising 4 frame buffers are provided to temporarily store the decoded frames, in accordance with the decoding program. The frame buffer means (BUF) are connected to digital to analogue convertor means (D/A) for outputting analogue video V to, a display.

It is remarked that the central control means (CTRL) and the decoding control means (CPU) may be combined. The invention may be implemented by means of both hardware and software, and that several "means" may be represented by the same item of hardware. Further, the invention lies in each and every novel feature or combination of features. It is also remarked that the word "comprising" does not exclude the presence of other elements or steps than those listed in a claim. Any reference signs do not limit the scope of the claims.

What is claimed is:

1. Method of decoding MPEG coded digital picture data, the method comprising:
    receiving MPEG compressed digital picture data in a forward reproduction order;
    storing the compressed picture data in at least one GOP (Group Of Picture) according to the MPEG standard, said compressed picture data including I-picture data, P-picture data and B-picture data;

retrieving the compressed picture data to produce decoded pictures by picture predictions according to a decoding method of the MPEG standard;

wherein if a reverse layback order reproduction is ordered;

repeatedly retrieving compressed picture data in a forward reproduction order for repeatedly decoding said retrieved picture data;

displaying the decoded picture data in an order reverse to the forward reproduction order, characterized by, temporarily storing the decoded picture data in order to reduce the times of repeatedly retrieving and decoding compressed picture data in a forward reproduction order;

decoding retrieved picture data employing said temporarily stored decoded picture data for display in an order reverse to the forward reproduction order; storing in addition compressed picture data of a previous GOP;

retrieving compressed picture data from the previous GOP in an forward reproduction order;

producing decoded pictures of the previous GOP by picture predictions according to a decoding method of the MPEG standard; and temporarily storing the produced decoded pictures of the previous GOP in order to limit retrieval of compressed picture data of the previous GOP to once-only.

2. Method according to claim 1, wherein said digital picture data comprise a GOP according to the NTSC or PAL format, characterised by, temporarily storing simultaneously a maximum of four decoded pictures.

3. Method according to claim 2, characterised by, repeatedly storing successively several decoded picture data of a GOP.

4. Decoding arrangement for decoding MPEG coded digital picture data comprising:

receiving means for receiving MPEG compressed digital picture data in a forward reproduction order;

storing means for storing the compressed picture data in at least one GOP (Group Of Picture) according to the MPEG standard, said compressed picture data including I-picture data, P-picture data and B-picture data;

retrieving means for retrieving the compressed picture data from said storage means;

decoding means for decoding pictures by picture predictions according to a decoding method of the MPEG standard;

decoding control means to control the retrieving means and decoding means;

display output means for displaying the decoded picture data, wherein if a reverse playback order reproduction operational mode is present, the decoding control means are being adapted to enable repeatedly retrieval of compressed picture data from the storing means in a forward reproduction order for repeatedly decoding said retrieved picture data;

characterized in that, the decoding arrangement further comprises:

memory buffer means for temporarily storing the decoded picture data in order to reduce the times of repeatedly retrieving and decoding compressed picture data in a forward reproduction order, and the decoding control means are adapted to control the decoding means to decode retrieved coded picture data employing said temporarily stored decoded picture data for display in an order reverse to the forward reproduction order; the storing means are adapted to additionally store compressed picture data of a previous GOP;

the decoding control means are adapted to control retrieval of compressed picture data from the previous GOP in an forward reproduction order and to control producing of decoded pictures of the previous GOP by picture predictions according to a decoding method of the MPEG standard; and the decoding control means are further adapted to control the memory buffer means to temporarily store the produced decoded pictures of the previous GOP for limiting retrieving of compressed picture data of the previous GOP to once-only.

5. Decoding arrangement according to claim 4, adapted to receive digital picture data comprise a GOP according to the NTSC or PAL format, characterised in that, the memory buffer means are adapted to temporarily store a maximum of four decoded pictures simultaneously.

6. Decoding arrangement according to claim 5, characterised in that, the memory buffer means are adapted to repeatedly storing successively several decoded picture data of a GOP.

7. Reproducing arrangement for reproducing MPEG coded digital picture data stored on an recording medium, comprising signal detecting means for detecting signals representing the information stored on the recording medium;

demodulating means for deriving bit signals from the detected signals;

channel demodulating means for obtaining the MPEG coded digital picture data; characterised in that, the reproducing means comprises decoding means according to claim 4.

* * * * *